(12) United States Patent
Tiwari

(10) Patent No.: US 7,961,886 B2
(45) Date of Patent: Jun. 14, 2011

(54) WIRELESS PERIMETER SECURITY DEVICE AND NETWORK USING SAME

(75) Inventor: Sameer Tiwari, Fremont, CA (US)

(73) Assignee: Bella Tosso AG, L.L.C., Dover, DE (US)

( * ) Notice: Subject to any disclaimer, the term of this patent is extended or adjusted under 35 U.S.C. 154(b) by 703 days.

(21) Appl. No.: 11/933,346

(22) Filed: Oct. 31, 2007

(65) Prior Publication Data

US 2008/0043695 A1    Feb. 21, 2008

Related U.S. Application Data

(62) Division of application No. 10/946,851, filed on Sep. 21, 2004, now Pat. No. 7,349,544.

(60) Provisional application No. 60/504,615, filed on Sep. 22, 2003, provisional application No. 60/531,972, filed on Dec. 24, 2003.

(51) Int. Cl.
*H04L 9/00* (2006.01)

(52) U.S. Cl. .............................. 380/277; 726/11; 726/14

(58) Field of Classification Search .................... 726/11, 726/14; 380/277
See application file for complete search history.

(56) References Cited

U.S. PATENT DOCUMENTS

| 7,349,544 B2 | 3/2008 | Tiwari |
| 2003/0143954 A1 | 7/2003 | Dettinger et al. |
| 2004/0187030 A1 | 9/2004 | Edney et al. |
| 2005/0020244 A1 | 1/2005 | Chang et al. |
| 2005/0042999 A1 | 2/2005 | Rappaport |
| 2005/0075070 A1 | 4/2005 | Crilly, Jr. |
| 2005/0094585 A1 | 5/2005 | Golden et al. |

FOREIGN PATENT DOCUMENTS

GB    2388275 A    5/2003

OTHER PUBLICATIONS

Notice of Allowability, mailed Jan. 29, 2010, for U.S. Appl. No. 11/933,336, 3 pages.
Office Action, mailed Mar. 2, 2010, for U.S. Appl. No. 11/933,314, 7 pages.
Office Action, mailed Mar. 15, 2010, for U.S. Appl. No. 11/933,327, 6 pages.
Office Action, mailed Feb. 22, 2010, for U.S. Appl. No. 11/933,299, 8 pages.
Office Action, mailed May 16, 2007 for U.S. Appl. No. 10/946,851.
Notice of Allowability, mailed Sep. 5, 2007 for U.S. Appl. No. 10/946,851.

(Continued)

*Primary Examiner* — Jacob Lipman
(74) *Attorney, Agent, or Firm* — Schwabe, Williamson & Wyatt, P.C.

(57) ABSTRACT

A Radio Frequency based security system for providing security for wireless Local Area Networks (WLAN) that allows the creation and maintenance of arbitrarily shaped secure wireless access areas with boundaries around said wireless Local Area Network and prevents access to the said wireless LAN from outside the perimeter of the secure area. The system includes a plurality of perimeter Radio Frequency Sentry Devices (RFSDs) that are employed to establish the boundaries of said secure area around said wireless LAN. The wireless LAN being secured may be an industry standard IEEE 802.11a, 801.11b or 802.11g based wireless LAN or any other wireless LAN that uses packet based communication protocols. The said RFSDs may be stand-alone devices or they may be connected to a wired or wireless Local Area Network.

44 Claims, 11 Drawing Sheets

Flowchart for the Active Packet Cloaking Technique employed in the Radio Frequency Security Device (RFSD) for one channel of Wireless LAN

OTHER PUBLICATIONS

International Search Report, mailed Jun. 7, 2007 for Application PCT/US2005/032996.
Korean Office Action, mailed May 9, 2008 for Application 10-2007-7008578.
Restriction Requirement, mailed Jan. 11, 2010 for U.S. Appl. No. 11/933,327.
International Preliminary Report on Patentability, mailed Jul. 10, 2007 for Application PCT/US2005/032996.
Written Opinion of the International Search Authority, mailed Jun. 7, 2007 for Application PCT/US2005/032996.
Notice of Allowability for U.S. Appl. No. 11/933,314, mailed Sep. 28, 2010, 3 pages.
Notice of Allowability for U.S. Appl. No. 11/933,299, mailed Aug. 24, 2010, 1 pages.
Final Office Action, mailed Jun. 3, 2010, for U.S. Appl. No. 11/933,299, 4 pages.

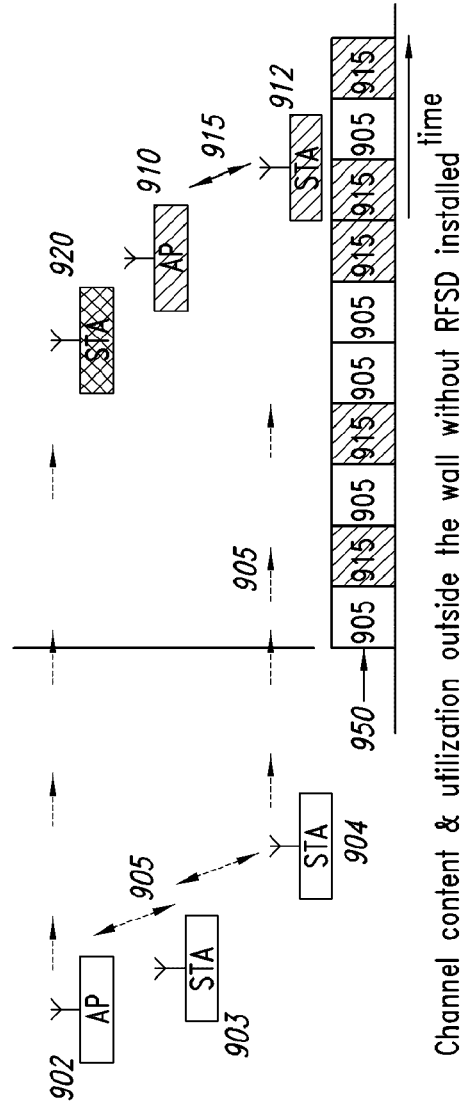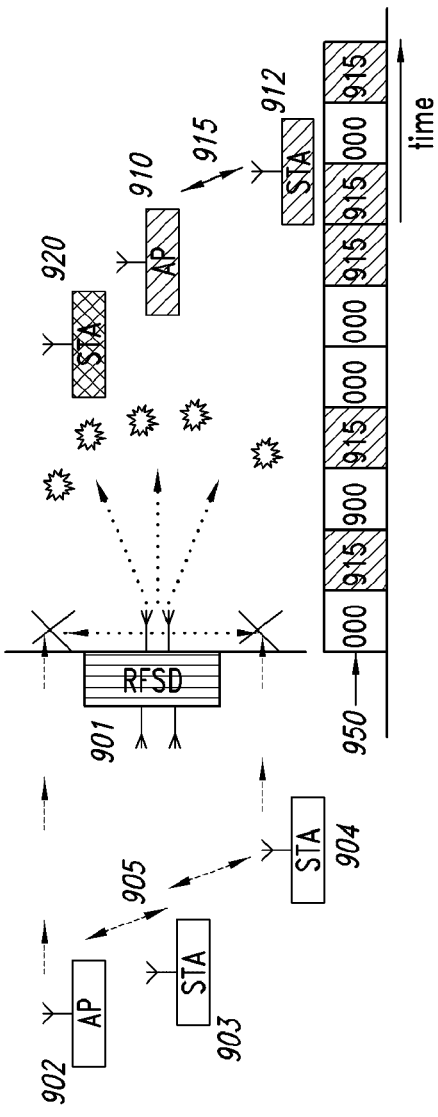

WIRELESS PERIMETER SECURITY DEVICE AND NETWORK USING SAME

CROSS-REFERENCE TO RELATED APPLICATIONS

Under 35 USC §120, this application is a divisional application and claims the benefit of priority to U.S. patent application Ser. No. 10/946,851, filed Sep. 21, 2004, entitled "Wireless Perimeter Security Device and Network Using Same", U.S. Provisional Application No. 60,504,615, filed Sep. 22, 2003 and U.S. Provisional Application No. 60,531,972, filed Dec. 24, 2003, all of which is incorporated herein by reference.

FIELD OF INVENTION

The present invention relates generally to network security systems and more particularly to wireless local area networking systems.

BACKGROUND OF THE INVENTION

Modem communication and networking solutions are increasingly adopting radio as a communications medium. Industry standards such as the IEEE 802.11/g wireless LAN protocols, the ease of deployment, and the demand for mobile access to data and applications have fueled an explosion in the number of wireless Local Area Networks in use both in commercial as well home environments.

An IEEE 802.11a/b/g based wireless LAN may be constructed as shown in FIG. 1, with at least one radio transmitter/receiver hub called an Access Point (AP) 101-102 and one or more wireless devices 103-104, that use these APs 101 and 102 to communicate with each other as shown by radio links 105, or to access a network resource. The APs may be connected to a wired LAN and thus can connect a wireless device 103-104 to a plurality of network resources. It is relatively inexpensive to set up such a wireless LAN, which makes this a popular method for providing network access. It is estimated that there are over 500 million wireless LAN devices in use worldwide today.

However, the use of radio frequency as the medium brings with it a unique set of security related issues. Wireless LANs are inherently different in risk compared to a wired LAN. While in a wired LAN the layers 1 and 2 of the network typically are protected by CAT5 cables in a secured building, in WLANs these layers are exposed because they are implemented using radio waves and therefore cannot be contained by a physical structure such as a building. Unlike wired networks, communication in Wireless LANs is not confined to a physical link such as a CAT5 cable; rather, it is broadcast through the air in multiple directions simultaneously and is therefore visible, and may be intercepted and deciphered. Essentially anyone with an available radio can eavesdrop and interject traffic into a wireless networks communication stream. This use of a non-physical communication link, i.e. radio waves, makes Wireless LANs more vulnerable to security threats than wired networks which use a cable such as a CAT5 cable to propagate data.

FIG. 1 illustrates a typical enterprise Wireless LAN. In IEEE 802.11a/b/g based WLANs, wireless devices are permitted to seek out and try to connect with other wireless devices in their vicinity as shown in Wireless LAN area 106 and to form ad-hoc networks. This uncontrolled association further increases the threat to an enterprise Wireless LAN. For example, an authorized user on the corporate network can innocently connect to a neighbor's network or be maliciously lured to connect to an undesirable or unauthorized wireless device outside of the company premises and thereby compromise the entire corporate network. For reasons such as these, mechanisms to secure Wireless LANs have become an area of great interest and a huge business opportunity.

Two key factors have driven the development of WLAN Security solutions and to a great degree existing industry standards:

1. "Wired network security mindset," which believes/operates on the assumption that once the access to a network is controlled, the network is safe. If data is encrypted for an added measure, then the result is foolproof security.

2. Failure of solutions developed with this mindset has made vendors more determined to make it succeed—by developing stronger access controls, stronger encryption, and dynamic keys.

The result is a myriad of expensive proprietary solutions that do not address the fundamental risks of using the radio frequency (RF) medium, and which, therefore, do not decrease the threats. Most of these passive solutions are cumbersome to deploy, because they do not take advantage of existing wired network infrastructure and they are economically prohibitive to maintain.

PRIOR ART

Most existing attempts to provide security for industry standard IEEE 802.11a/b/g Wireless LANs may be categorized as follows:

1. WEP based security solutions. This is the most basic form of security that is provided in a wireless LAN where a fixed secret code or key known only to authorized users of the WLAN is used to restrict access to only those wireless devices that have the correct secret code or key available to them. This scheme is based on an RC4 encryption algorithm, has been compromised and is no longer considered to be a viable security solution.

2. WPA/802.1x based security solutions. This scheme was invented to overcome the shortcomings of WEP. This scheme involves dynamic keys and the authentication of the key each time a wireless device attempts to connect to the network. This scheme has also been compromised. There are several issues with Key management and weakness in the cryptography scheme. It has been shown that it is possible to decipher the secret key and gain unauthorized access to the wireless LAN. It is widely accepted that this method does not provide adequate security for a wireless LAN.

3. Virtual Private Networks (VPNs). This mechanism was adopted from the wired LAN side. Security is provided by creating virtual connections between wireless devices and their destination by virtue of encrypting the data transfer between them that is not decipherable by an unauthorized entity. This scheme works well in the wired LAN domain because the data is transmitted over a physical link such as a CAT5 cable. Unless someone can tap into that CAT5 cable, they cannot view the encrypted data stream. However, in the case of a wireless LAN, the data stream may be intercepted by a radio eavesdropper and potentially decoded. More importantly, it would be possible for a hostile entity to merely establish an ad-hoc connection with the authorized wireless device at one end of the virtual path and camouflage itself as if it were the authorized device itself. This is referred to as spoofing. It has been demonstrated that this type of security breach is possible.

4. Intrusion Detection Systems. These solutions rely on their ability to detect any radio frequency activity outside a known perimeter. As such, they are rendered ineffective by hostile entities that eavesdrop using a passive or listen-only mode and thus do not generate any radio frequency activity. It is widely accepted that this solution does not provide adequate security for wireless LANs.

5. Perimeter Control systems. These solutions depend on their ability to differentiate between authorized and unauthorized sources of radio transmission by measuring the relative signal strength of the radio frequency carrier signal. However, naturally occurring phenomenon such as multi-path signals may easily cause Use alarms or camouflage unauthorized sources. In addition, passive eavesdropping is not detected by this solution. It is widely accepted that this solution is not ideal for providing a secure wireless LAN.

Thus the inability of any of these above approaches to restrict access to the radio waves carrying the Wireless LAN traffic renders them vulnerable to sophisticated radio frequency eavesdroppers and hence cannot be deemed secure. Accordingly, what is needed is a system and method to overcome these problems. The present invention addresses such a need.

BRIEF SUMMARY OF THE INVENTION

A wireless network comprising: at least one wireless device that transmits radio traffic; and at least one radio frequency security device (RFSD) for altering the radio traffic based upon a defined perimeter of the network.

The present invention is directed to a system and method that effectively eliminates the stated vulnerabilities of the uncontrolled radio frequency medium and unauthorized association of wireless devices in a wireless LAN by creating a secure area that physically isolates the Wireless LAN and its associated network traffic.

The present invention eliminates data sniffing or interception of radio waves and ensures that authorized wireless devices connect only within such secured zone. The present invention thus provides a unique and comprehensive security solution for wireless LANs. It should be clear that the present invention maybe used by itself or in conjunction with any of the said existing solutions to provide security for a wireless LAN.

BRIEF DESCRIPTION OF THE DRAWINGS

FIG. 9a illustrates active packet cloaking, with channel content and utilization outside the wall without RFSD installed.

FIG. 9b illustrates active packet cloaking, with channel content and utilization outside the wall with RFSD installed.

DETAILED DESCRIPTION

The present invention relates generally to network security systems and more particularly to wireless local area networking systems. The following description is presented to enable one of ordinary skill in the art to make and use the invention and is provided in the context of a patent application and its requirements. Various modifications to the preferred embodiments and the general principles and features described herein will be readily apparent to those skilled in the art. Thus, the present invention is not intended to be limited to the embodiments shown, but is to be accorded the widest scope consistent with the principles and features described herein.

Figure 7:
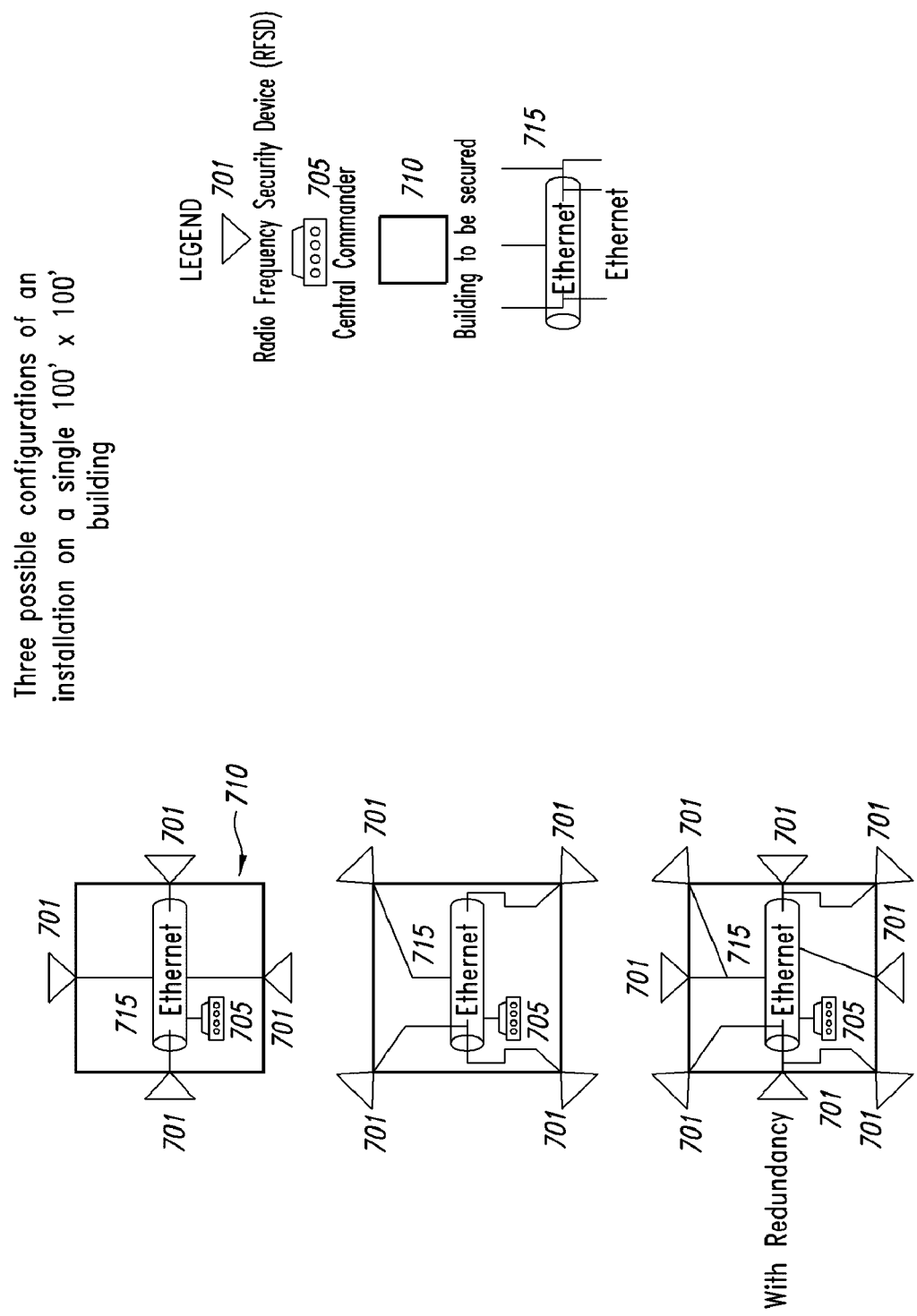
FIG. 7 shows three possible configurations of an installation on a single 100'×100' building.

The present invention provides for a system and method that allows for the "cloaking", i.e., rendering of radio packets invisible, of wireless or radio wave traffic from devices within a defined space, using devices called Radio Frequency Security Devices (RFSDs) that define the perimeter of that secure space. This is shown in FIG. 7, which depicts a plurality of deployment choices of the present invention. The system includes one or more RFSDs 701 and an associated Central Commander unit 705 connected to each other over either a wireless (WLAN) or wired network (LAN) 715.

Figure 1:
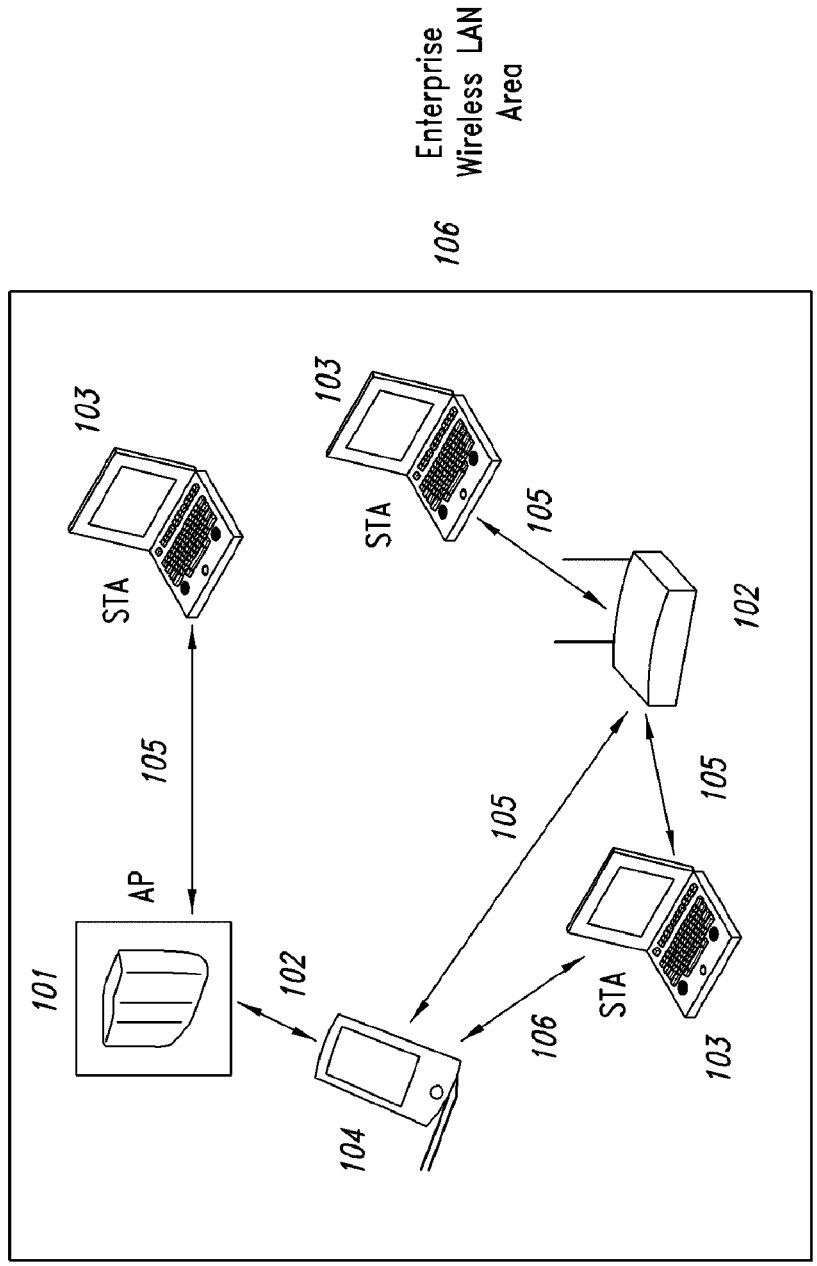
FIG. 1 shows a typical Enterprise Wireless LAN.
Figure 2:
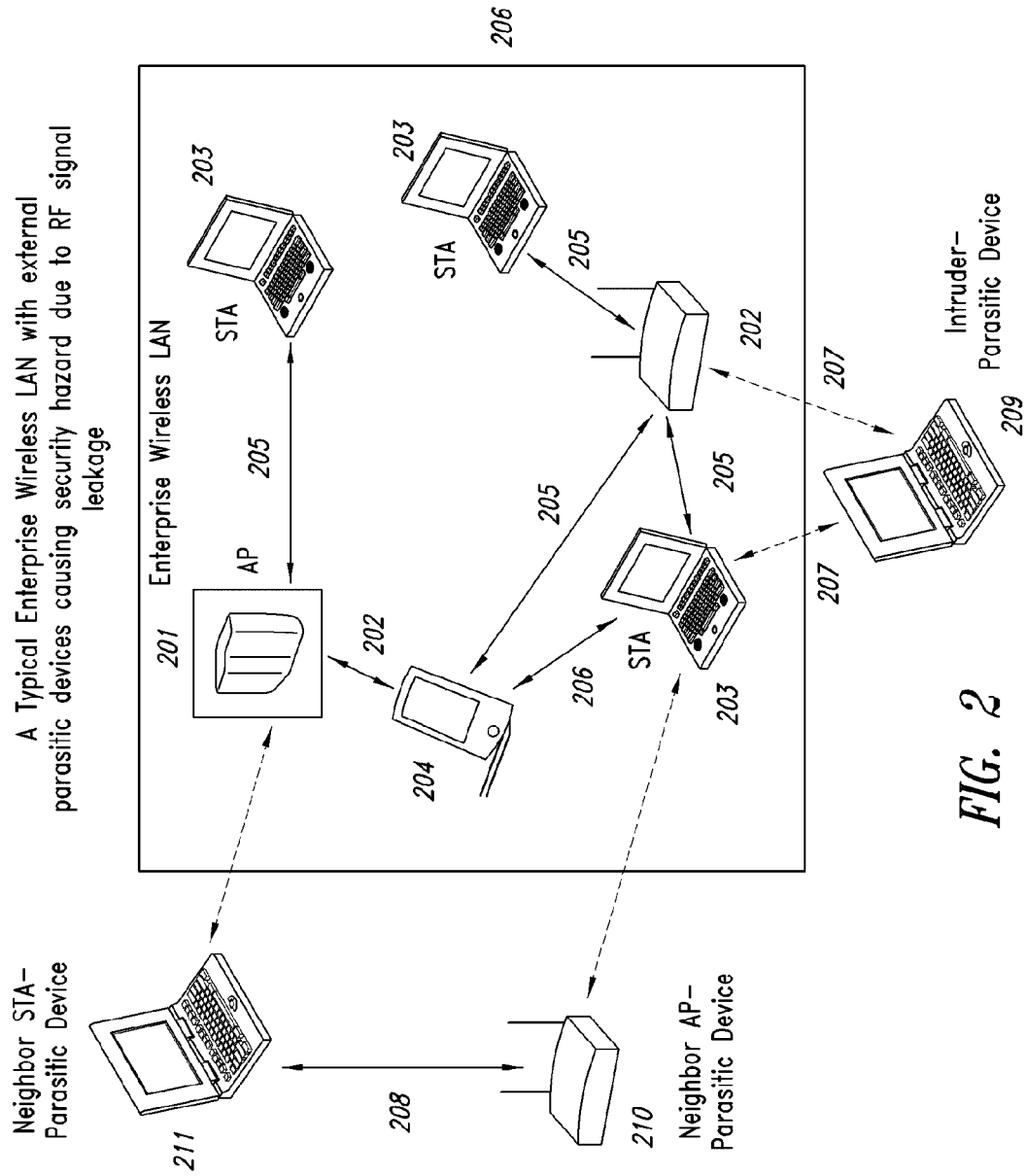
FIG. 2 shows a typical Enterprise Wireless LAN with external parasitic devices causing security hazard due to RF signal leakage.

FIG. 2 shows a typical wireless LAN (WLAN) deployed in a building. The components of this WLAN are one or more Access Points (APs) 201-202 and a plurality of wireless access devices 203-204. The devices are connected to the APs 201-202 and to each other via radio connections 205. The Access Points (AP) 201-202 are usually connected to a wired LAN backbone. FIG. 2 also shows the excursion of WLAN radio traffic 207 outside the desired perimeter, i.e., the confines of the building. This enables parasitic external wireless devices 209, 210 and 211 to receive, decipher and interfere with the authorized and legitimate members of the WLAN.

Figure 3:
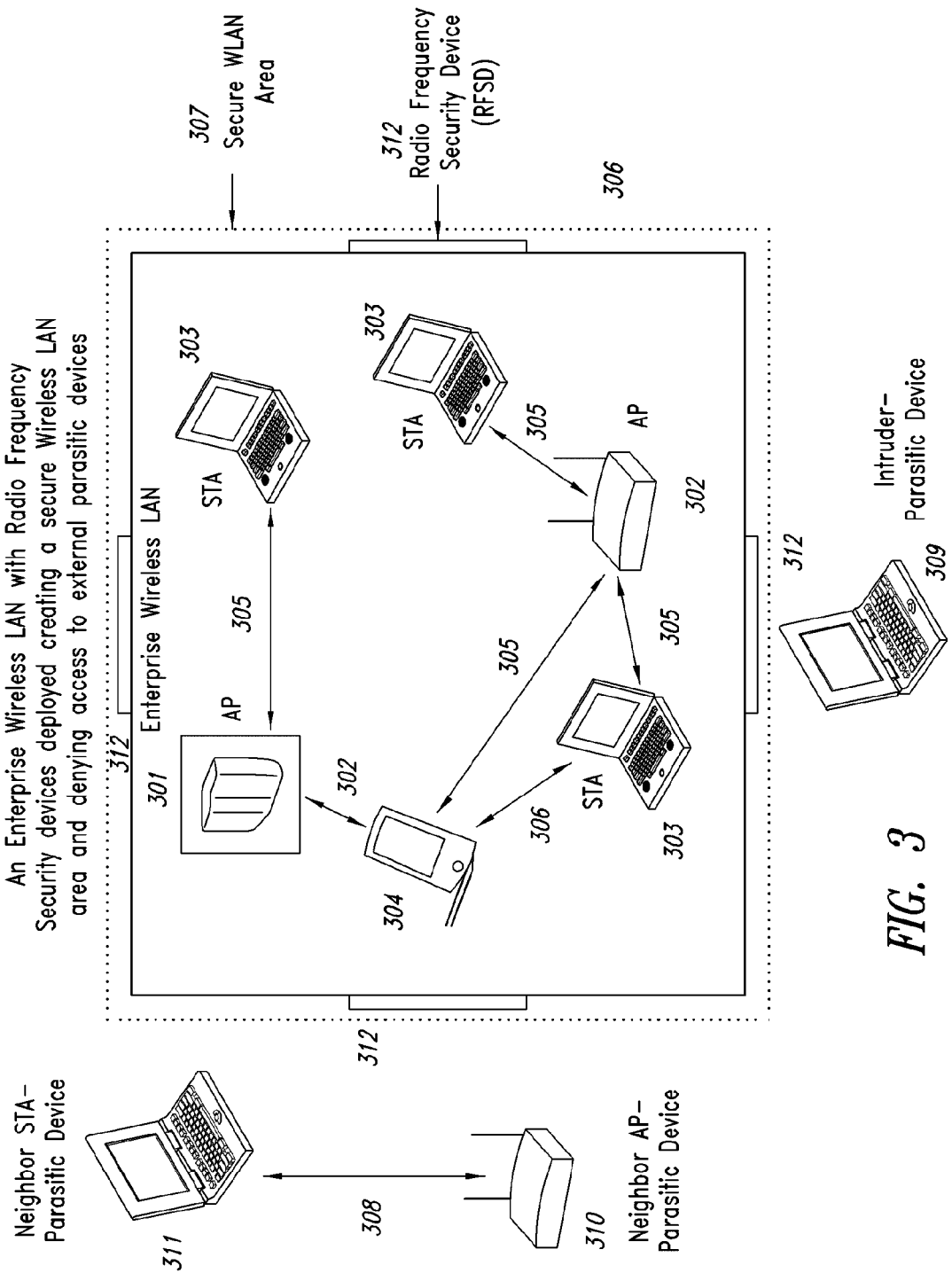
FIG. 3 shows an Enterprise Wireless LAN with Radio Frequency security devices deployed creating a secure Wireless LAN area and denying access to external parasitic devices.

The vulnerable WLAN shown in FIG. 2 may be secured at the radio wave level by using the present invention as shown in FIG. 3. The secure WLAN in FIG. 3 includes the WLAN shown in FIG. 2 and includes AP 301-302; multiple wireless access devices 303-304 combined with plurality of instances of the Radio Frequency Security Devices (RFSDs) 312 placed on the perimeter of the building or secure WLAN area 307. As shown in FIG. 3, there is no excursion of WLAN radio traffic beyond the perimeter 307 defined by placement of multiple instances of the RFSD 312. This prevention of radio traffic excursion outside the desired secure perimeter prevents un-authorized or hostile wireless devices 309, 310 and 311 from receiving or interfering with the WLAN radio traffic from within the secure area 307.

Figure 8:
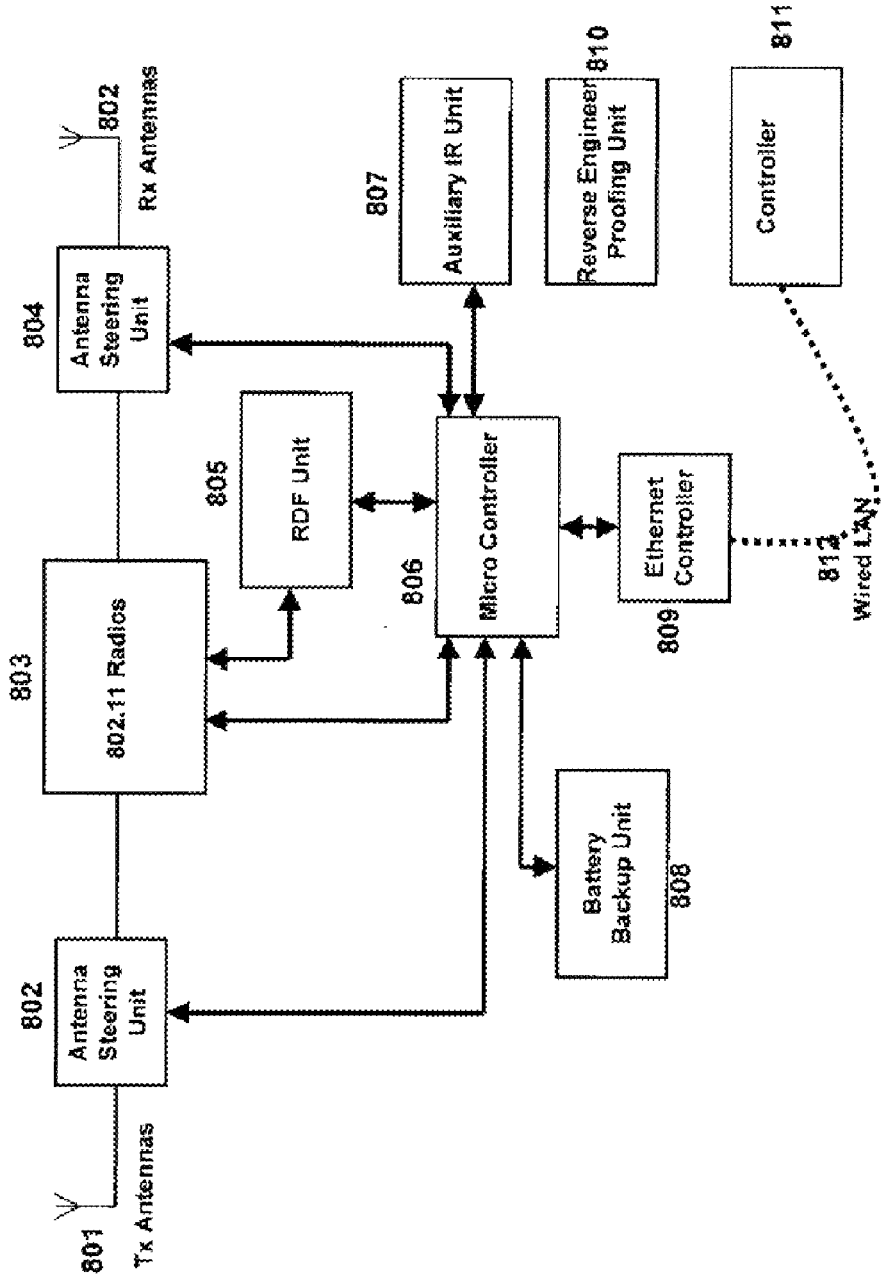
FIG. 8 is a block diagram of the RFSD for a single channel 802.11 type protocol set.

The RFSD is shown in FIG. 8, and includes a radio transmitter and receiver combination 803, a micro-controller 806 and a set of antennas 801-802 and antenna steering units 802,804. The RFSD may also include a battery unit 808, an Ethernet controller 809 and an Infra-Red (IR) communications unit 807. Also integrated into the RFSD is a Reverse Engineering Prevention Unit 810, which is an electronic device that will destroy the RFSD circuitry if it is tampered with. As shown in FIG. 3, these RFSDs 312 create an invisible radio wall 307 around a defined space outside of which the wireless radio traffic within the said space is rendered invisible and indecipherable. In effect, radio data packets crossing the said radio frequency wall 307 are destroyed, using a technique called Active Packet Cloaking (APC), thereby rendering them invisible to unauthorized wireless devices that exist outside the secure space. The present inventive approach to "cloaking" i.e., rendering radio packets invisible, may be applied to cellular or pager networks or indoor/outdoor to wireless Local Area Networks (WLAN) and communication protocols such as IEEE 802.11 xx. Essentially this inventive approach can be applied to any packet switched digital communication.

Component Descriptions Antenna

The antennas 801 and 802 shown in FIG. 8 used in the RFSD are directional antennas, with variable coverage pattern, and a very high front to back ratio.

Wireless Device

The wireless devices may be any known portable or transportable device as shown in FIG. 3, configured for wireless communications, such as a mobile telephone, personal digital assistant (PDA) 304, pager, email devices, laptop 303, desktop computers, printers, projectors, Access Points 301, 302 and 310, repeaters, cameras or any other network-enabled device. Many of such devices may be handheld devices, but other wireless devices that are not of such a compact size could also be detected and cloaked. These mobile devices are configured to communicate with a network through a wireless interface.

Cloaking Description

Referring to FIG. 7, the cloaking system consists of a plurality of devices called Radio Frequency Security Devices (RFSDs) 701, placed around a predetermined perimeter to create a secure area for a Wireless LAN of interest. The systems may be enhanced by the inclusion of at least one data processing system. The data processing system may include a user interface and includes memory to facilitate the initial setup, operation, and maintenance of the system, collectively known as the Central Commander 705. The RFSDs may be stand-alone or may be connected to each other via a wireless or wired network 715. The network may also include or have access to a variety of functionality and data, which may be hosted on the network or on subsystems or on systems accessible via the network, possibly via another one or more networks.

Defined or Secured Space Definition

A defined or secure space is comprised of a set of defined regions, areas or location (collectively known as "locales"). A locale may be defined as an interior or exterior space or location, or a combination thereof. For example, a conference room may be defined as a locale. Each locale is defined within the system in relationship to the digital form of the physical space (maps of the building/structure). Locales are defined with a multi-step approach, and at any time a decision may be made by the system that enough accuracy has been achieved and more steps are not required.

Defining the Space

As the first step, the placement of a plurality of RFSDs on the perimeter combined with the radiation pattern of the receiving and transmitting antennas of these RFSDs, defines accurately but in coarse-grained quality the outline of the perimeter. The second level of granularity is achieved by using the difference of signal strengths using two or more directional antennas facing in different directions. The third level of granularity is achieved by using signal-timing analysis; using Time (Difference) of Arrival (TOA or TDOA) based measurements. Locale definition should preferably be achieved without involving any RF surveys or provide training to the system, where an initial radio frequency propagation map has to be plotted and it becomes specific to an environment.

Time (Difference) of Arrival (TOA or TDOA)

Time (Difference) of Arrival (TOA or TDOA) are well-defined techniques that have been used for years for locating transmitting devices based on the fact that RF travels at a constant speed of light (an assumed constant for most practical work), so the farther the transmitter is from a receiver the longer it will take for the signal to arrive. In the preferred embodiment of the TDOA implementation in the RFSD, there are two or more receiving systems that are separated from each other by a fixed and known distance.

Figure 4:
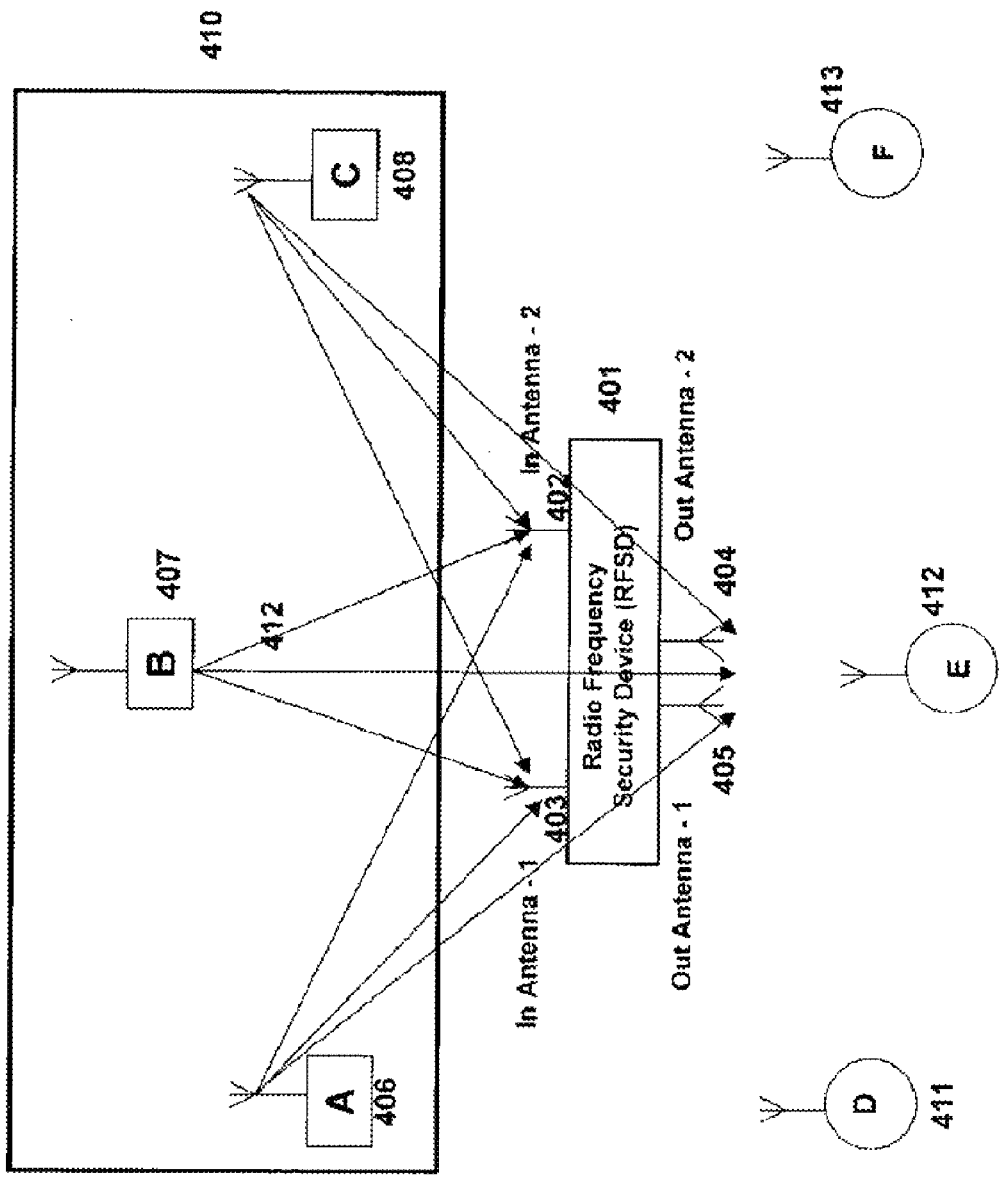
FIG. 4 illustrates a first example of multipath issues.
Figure 5:
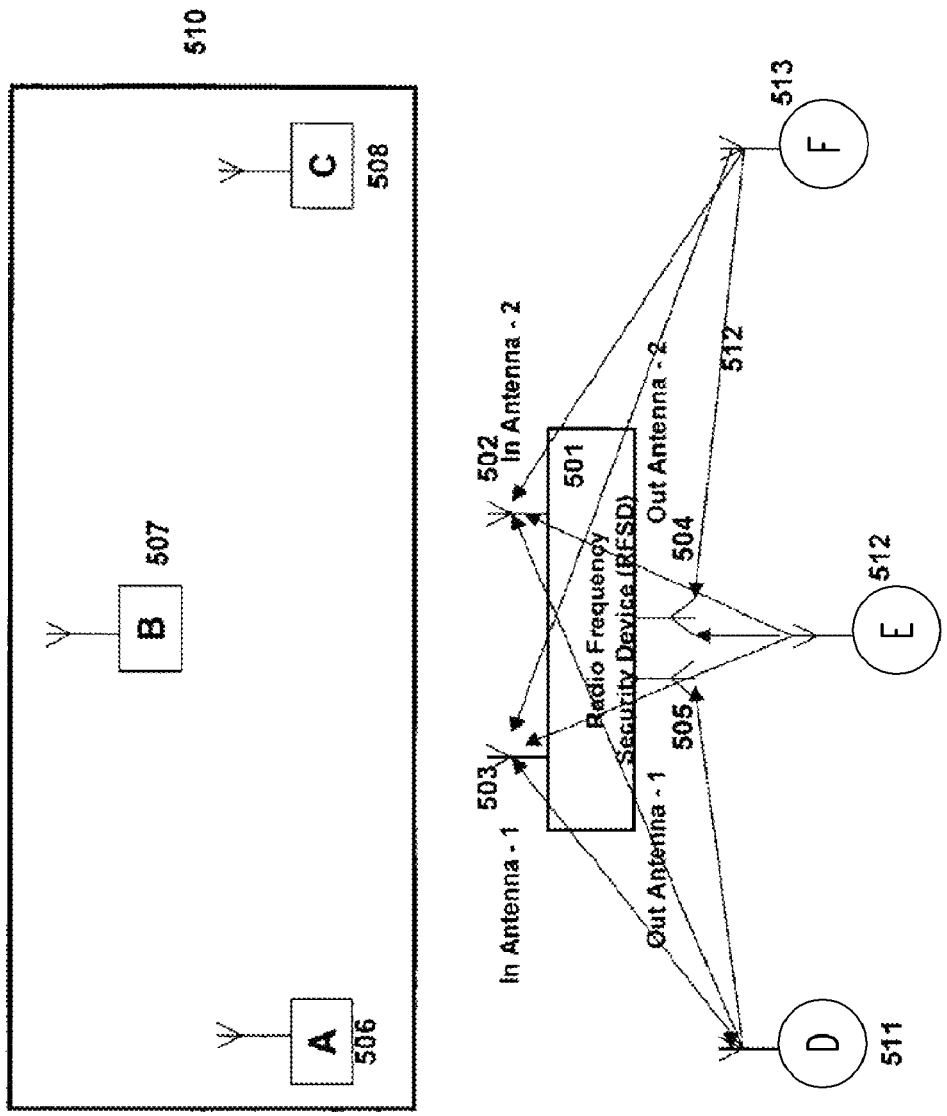
FIG. 5 illustrates a second example of multipath issues.

By doing a signal analysis of the two signals a very accurate determination can be made about the direction of the signal origination. The use of one or more antennas once again separated by a fixed and known distance, will give the distance of the originating signal. For example, in FIG. 4, the signal 412 originating from a device 406-407-408 inside the "Secured Space" 410, will reach the four antennas 402-403-404-405 in the RFSD at different times and different signal strengths, depending its location. Similarly in FIG. 5, the signal 512 originating from a device 511-512-513 outside the "Secured Space" 510, will reach the four antennas 402-403-404-405 in the RFSD at different times and with different signal strengths, depending on the location of its origin. Wireless devices 406-407-408 and 506-507-508 are shown as example locations inside and outside the "Secured Space" respectively.

Resolving Multi-Path Problems

Figure 6:
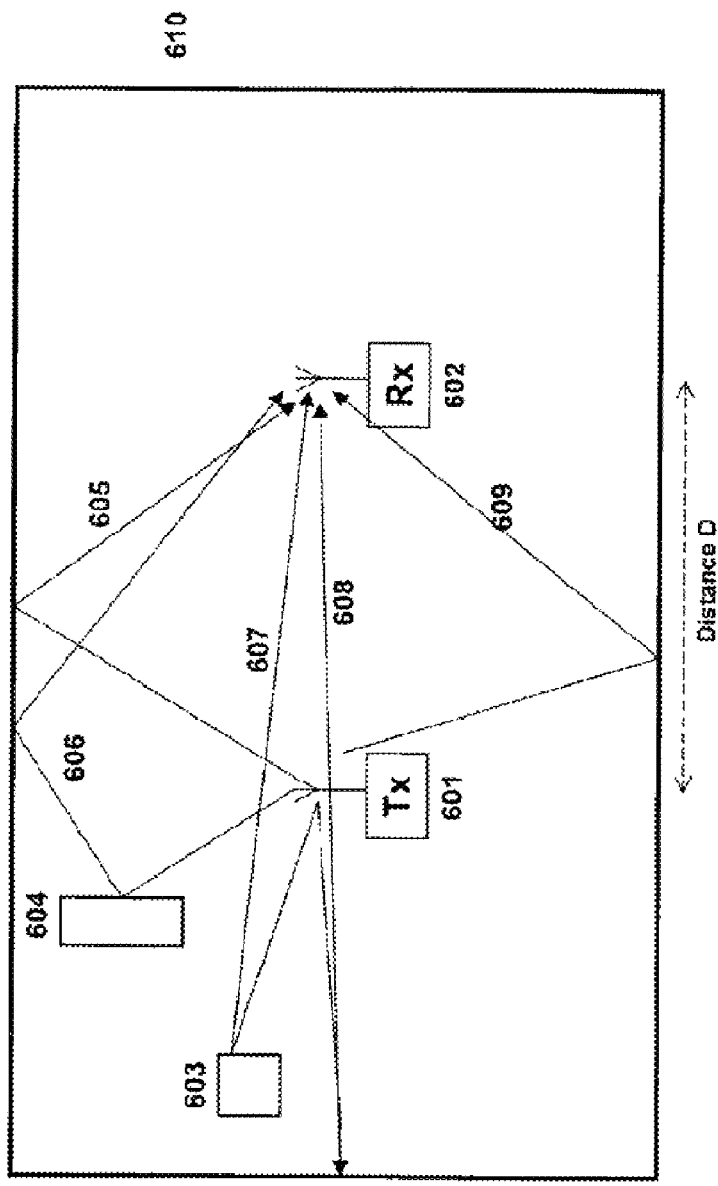
FIG. 6 shows examples of indoor radio frequency multipath travel.

One other major problem for location systems like the one described above results from multi-path radio waves. The problem is much more pronounced indoors, due to many more reflection surfaces present in close proximity. While there are multiple ways to combat this issue, the preferred way of doing this is achieved by doing the signal analysis in the smallest time window possible so that the multi-path does not even start taking place. FIG. 6 depicts a few examples of how a signal from a transmitter (Tx) 601 can reach the receiver (Rx) 602. There are an infinite number of combinations on how the signal can reach the Rx, but a few—603, 604, 605, 606, 607, 608—are shown for the purpose of this discussion. If the minimum distance between the transmitter Tx 601 and receiver Rx 602 is D meters, then the minimum time for the first signal to reach from transmitter Tx 601 to receiver Rx 602 is D/C seconds where C=speed of light in meters per sec.

All the other multi-path signals will reach the receiver Rx 602 after this first signal has been received. Because this system is applied to packet switched networks and not constant carriers, a very accurate determination is possible. The determination of D may be a combination of empirical and computed results.

Active Packet Cloaking

Once the secured space is defined and the RFSDs are in place along the perimeter, the RFSD is enabled to perform Active Packet Cloaking (APC). APC is the core of the "cloaking" invention. The APC system is composed of 3 major components: a receiving side, a transmitting side and control electronics. The receiving side is composed of one or more receiving systems and the transmitting side is also composed of one or more transmitting systems. The receiving and transmitting systems will typically be pointing in different directions. The two are controlled with control electronics to control when and what is to be received or transmitted.

Packet cloaking is achieved by identifying a packet originating from within the Secured Space and instantly transmitting an altered packet out and away from the Secured Space perimeter. The transmission is typically at the same power level as the received packet that triggered it. The net result is that a receiver outside the Secured Space cannot decipher the packets that are originating from inside the Secured Space. Any communication between devices outside the secured area will work unaffected, as only the packets originating from within the Secured Space are being altered.

For example—The IEEE 802.11a/b/g protocols use the half duplex CSMA/CA protocol for access arbitration. CSMA/CA allows multiple people to use a single communication channel, with only one person transmitting at a time. With the present invention, i.e., the "Cloaking" system in place, the channel usage remains unaltered and identical to that prior to the introduction of said "Cloaking" system. The only difference now is that the slot being used by a transmitter inside the Secured Space now contains altered data as opposed to the original valid IEEE 802.11/g packet.

Shown in FIGS. 9A and 9B are three pairs of IEEE 802.11/g compliant wireless devices, communicating on the same channel. The authorized devices 902-903-904 are inside the "Secured Space"; the two outside devices 910-912 are on an independent network outside the "Secured Space" on the same channel; and the parasite device 920 is a malicious station that is listening to both inside WLAN traffic 905 and outside WLAN traffic 915.

FIGS. 9a and 9b the show the wireless packet stream 950 and channel utilization for the above environment. To demonstrate the principle clearly a perfect scenario is assumed, with fixed length packets 905-915, no wasted slots and no random back off interval, etc. The packet stream 950 consists of a sequence of packets from both the inside WLAN 905 and the outside WLAN 915 in a chronological order. As shown in FIG. 9a, with the RFSDs absent, the individual packets 905-915 are clearly visible in the stream 950 outside the "Cloaked Space".

When the RFSD 901 is present only the packets 905 originating from within the "Cloaked Space" going past the RFSD 901 perimeter, are cloaked and effectively destroyed as shown by the packets 000 in the packet stream 950 illustrated in FIG. 9b, thereby creating an "invisible wall", for the packets. The net result is that the channel utilization remains unaltered for the inside WLAN traffic 905 and the outside WLAN traffic 915, just that the "outsiders" cannot see the "insiders" wireless traffic. The parasite wireless device 920 now can still listen to the valid communication 915 of the outside or unprotected WLAN, and none of the two outside wireless devices see/hear the inside or protected WLAN traffic 905. Outside the secure perimeter WLAN traffic packets that originate from within the secure area appear as blank packets 000 in the packet stream 950.

The inside network, however, will see the outside WLAN, but can never connect to it, as any packets coming from the inside, going outside are destroyed. In order for the inside network not to see the outside, the RFSDs may be enhanced to prevent the outside radio packets from entering the Secured Space in the similar manner.

Flow Chart of APC

Figure 10:
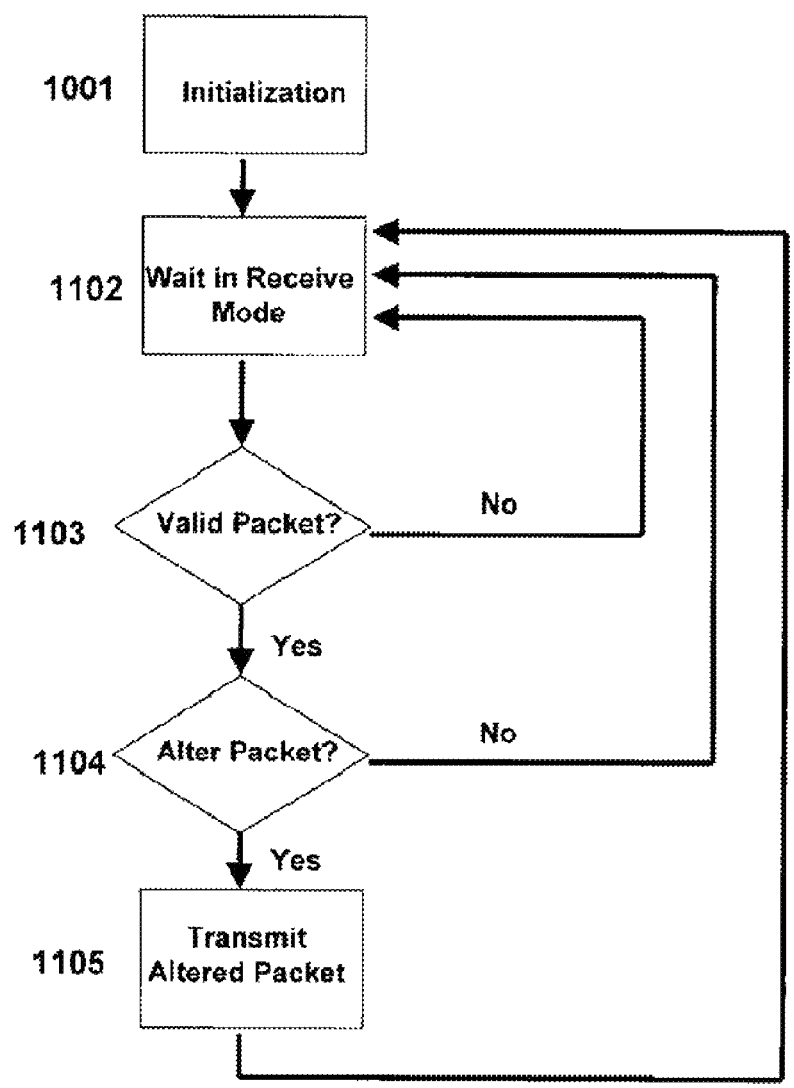
FIG. 10 is a flowchart for the active packet cloaking technique employed in the radio frequency security device (RFSD) for one channel of Wireless LAN.

FIG. 10 is a flowchart which describes the Active Packet Cloaking Technique employed in the RFSD for one channel of Wireless LAN.

Self-Tuning Mode

An RFSD gathers and maintains information about its surrounding peers and their status to maintain redundancy and allow for self-healing of the network, in case the need arises. Self-healing would be required in case one of the RFSDs malfunctions or executes at reduced power levels due to a failure or partial failure in the RFSD or the data processing system.

The central controller typically triggers the self-tuning mode. However, as an alternative, the RFSDs can initiate this action independently as well. The system sets itself up by having one or more RFSD transmit and the others listen, in multiple combinations, to gather sufficient data about the radio frequency environment, to create a Radio Frequency map of the area. This mode can be triggered periodically during idle time, based on a configuration or a default factory setting. Corrective actions will include notification to the Central Controller, audio and/or visual indication at the device, adjusting the power output of the neighboring RFSDs, adjusting the antenna directivity and radiation patterns, and adopting a low risk approach of blocking all suspicious packets. The compromise is made in favor of security over efficiency.

RFSD

FIG. 8 provides a block diagram of a single channel RFSD, suited for IEEE 802.11a/b/g/ protocols. The preferred embodiment of the RFSD will include transmit antenna 801 and receive antenna 802; multiple radios 803, one or more radio direction finding (RDF) units 805 and controlled with a micro controller 806. The radios 803 will be selected depending on the protocol of interest.

The RDF unit 805 is a signal analyzer that will compare two signals for strength and time of arrival and is also controlled by the micro controller 806. To account for the differences in the electronics in the multiple paths from the antenna to the RDF unit 805, a calibration will be done as a part of the "self-tuning" to generate and store an offset value to be applied during a real measurement. The Antenna steering unit 802-804 may be a phased may antenna control, or a simple antenna switch to transmit with another antenna present in the RFSD, or a physical antenna rotator, or a combination thereof. Multiple channel coverage will be achieved by replication of the above-mentioned architecture or by multiplexing across the channels.

Sanitized Wireless Zone (Dagger)

Figure 11:
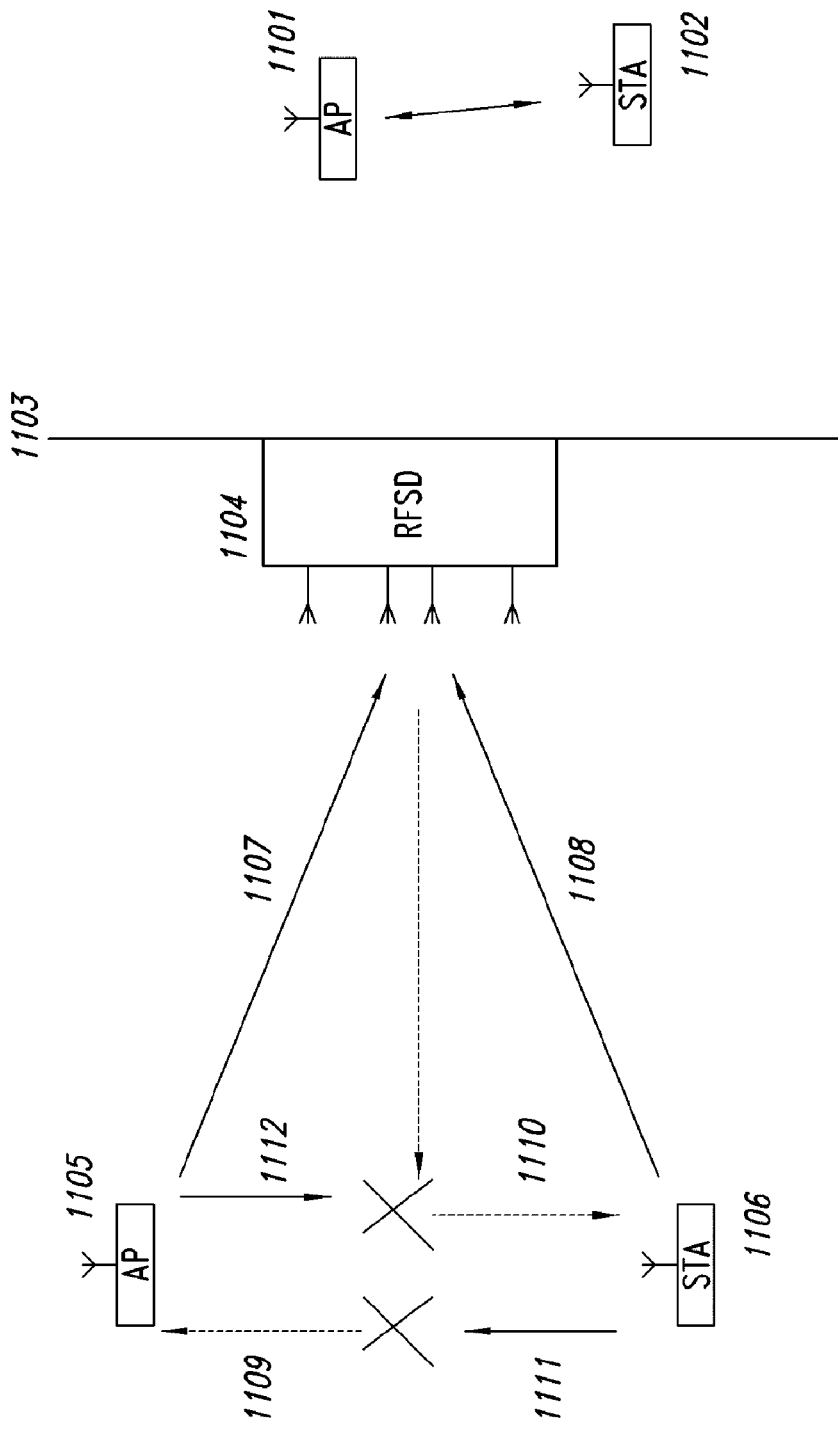
FIG. 11 is an example of the RFSD to create RF sanitized environments (dagger).

A direct effect of turning the transmitting antennas to point in the same direction as that of the receiving antennas and/or reversing the receiving antennas as the transmitting antennas, enables the RFSD to be used to "sanitize" a Defined Space where a specified type of packet switching digital communication wireless network will be disabled. FIG. 11 describes one of the possible applications. The two transceivers 1105 and 1106 in FIG. 11 attempt to establish communication, the wireless protocol handshake never completes successfully, as the RFSD destroys all packets 1111-1112 that it sees originating from within the "Sanitized Space". The outside network, comprised of AP 1101 and wireless device 1102, also never sees the handshake that is trying to take place inside. The insiders, however, will see all the wireless traffic that is happening outside the "Defined Space".

Cloak and Dagger Application

The use of the RFSDs in both possible manifestations, i.e., cloaking packets leaking out from a secure space perimeter or cloaking packets within a secure space perimeter, allows the creation of sanitized, open access and secure zones.

Reverse Cloak Application

Reversing the Receiving and Transmitting Antennas on the RFSDs, results in the outside wireless networks being hidden from view of the insiders.

Forward and Reverse Cloaking Application

Using the combination of the reversed Cloak and the regular Cloak, creates a system where not only the inside wireless network is hidden from the outsiders, but the outside wireless network is also not seen by the insiders.

Redundancy

Redundancy is applied in two forms, one is within the RFSD by having backup Transmitting and Receiving systems, which can be used either under extreme unexpected load conditions and or environment changes or whenever the RFSD decides that these backup units need to be kicked in as well for additional security, or when one of the Tx/Rx chains fails/partially fails.

The other form of redundancy is by adding additional devices on the Secured Space, as shown in an example in FIG. 7.

Battery Backup

Two levels of battery backups are provided in the RFSD, one to ensure continued service during power failures where the internal wireless network is still functioning. As the battery power is limited, the preferred way is to power the Cloaking system with the same power grid/circuit as the internal wireless network to be secured. Here again the power will be most conveniently delivered using Power Over Ethernet (POE) or slightly modified POE for higher power rating. The second level of the battery backup is for the controllers, to have enough time to perform an elegant shutdown.

Reverse Engineering Proofing

Reverse engineering causes a huge impact not only on individual companies, but economically in general, as well. In order to discourage these malpractices by people or companies with ulterior motives, a well thought out "Self Destruct Mechanism" has been designed to put inside the RFSDs.

At the first level, stolen/lost RFSDs are useless without the authorization of the Central Controller. Each RFSD and Central Controller will be hard-coded, with a GUID like identification and each RFSD is further tied with a Central Controller, discouraging malicious use of the RFSDs. For special purposes an override mode will exist that will let the RFSD function without the Central Controller as well.

At the second level, any attempt to open the RFSD without a special electronic key (RFSD Key), will result in burning out most of the critical circuitry including some of the PCB tracks with minimum visual damage. This is done with critically placed fuses across the boards to blow up the critical components; this power is derived from the battery backup and capacitors.

The RFSD Key will be a mix of unpublished sequence delivered using IR/RF and proximity switches and receive an ACK/NACK confirmation back from the lock inside the RFSD. The RFSD Key distribution will be limited to manufacturing only and not to the field, except with prior approval, thereby discouraging stealing/copying of the key.

Alternate Access to RFSD

As it is possible that the RFSDs may be mounted in difficult to reach places, and there may be times that direct access to the device is required to update/configure/run diagnostics an alternate method of communication is made available through an Infrared (IR) port. The other alternative to access the RFSDs will be via another piece of software that can hook up directly to the Ethernet cable coming out from the RFSD.

Physical Installation of the Cloaking System

There are lots of different scenarios that can apply to the Cloaking System deployment, of which some have been pictorially described in FIG. 7. The actual mounting of the RFSDs will be highly dependent on the type, shape and the surroundings of the "Space to be cloaked", however a typical installation will be done just outside the building or on a pole mount similar to a security camera or such other device.

In some cases it may even be possible to mount the RFSDs on the inside of a building say on a window or other such opening, it may even be possible to do a "split install" in which case part of the device is inside the building connected to an Ethernet jack and power or a POE jack/device, and another part sits in a weather proofed enclosure just outside the wall, connected with a cable that has been drilled through the wall. All of this mounting will be done by following the guidelines of the building and the Federal and State codes for installing external devices on or near a building, electrically connecting the devices to inside the building. Similar Codes will be followed for mounting the RFSDs and passing cables in an outdoor setup as well.

Central Controller Description

The Central Controller (CC) is the control authority and holds knowledge of all other systems in place. As and when the RFSDs power up, they register themselves with the CC, the RFSDs can communicate with each other via the CC, or lookup another RFSD from CC and establish a direct contact with it. The CC is a piece of software running on a computer on the same network, where the RFSDs are connected. The communication between the RFSDs and the CC is done over a secure tunnel to discourage theft and misuse. This also allows deployment across insecure networks. There can be one or more CCs that collect the information from and send information to the RFSDs. Essentially the CC works on a distributed architecture, where each CC talks to a set of RFSDs and send the information to the others as well. This architecture allows for redundancy, fail-safe operation and load balancing.

The User Interface (UI) in the CC is used for defining the space preferably with the use of a map of the space being cloaked; this information is then used for tuning the definition of the space. The CC collects the telemetry data from the RFSDs to monitor its health and statistics, to be displayed on a UI and/or stored for generating reports. The CC is also used as a single point software upgrade for one or more RFS devices.

The CC will also have SNMP interfaces available so that the Blue Leaf system can be monitored/administered using third party network management software, e.g., IBM Tivoli or HP OpenView.

An API will be provided for the CC that will allow installations or companies using proprietary network management solutions, to integrate this system into their solution, so that the CC's UI need not be used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A Radio Frequency Security Device (RFSD) for a security-enhanced wireless communication system, capable of shielding radio frequency (RF) communications traffic across a perimeter of the wireless communication system from detection, the RFSD comprising:

an antenna means for transmitting and receiving wireless packets, a receiver coupled to the antenna means to receive a first wireless packet from a wireless device located internal or external to the perimeter of the wireless communication system, a transmitter coupled to the antenna means to transmit a second wireless packet to a second wireless device located internal or external to the perimeter of the wireless communication system to make the first wireless packet indecipherable to the second wireless device, and a network controller coupled to the receiver and the transmitter to communicate with a central controller (CC) via a secure channel, the central controller being configured to adjust the perimeter of the wireless communication system, wherein said RFSD is configured to communicate with one or more access points (APs) or other wireless devices resident within a locale, and wherein said RFSD is configured to track and locate external devices or networks, or local devices.

2. The RFSD of claim 1, wherein said wireless communication system includes one or more wireless local area networks (WLANs).

3. The RFSD of claim 1 wherein the network controller is coupled with a LAN backbone.

4. The RFSD of claim 1 wherein the antenna means is directionally steerable.

5. The RFSD of claim 1, wherein the central controller is further configured to collect data from the RFSD and to monitor an operational status of the RFSD.

6. The RFSD of claim 1, wherein the central controller is further configured to receive configuration information related to said perimeter of the wireless network from an administrator of the wireless network.

7. The RFSD of claim 1, wherein the network controller is coupled to another central controller, and wherein the central controller is further configured to share information related to the RFSD with the another central controller.

8. The RFSD of claim 1, wherein the central controller includes:
   a registry to receive registration request from the RFSD; and
   a control authority having information related to the RFSD.

9. The RFSD of claim 1, wherein the central controller is operatively coupled to the RFSD via a wired or wireless secure communication channel.

10. The RFSD of claim 1, wherein the RFSD is further configured to periodically:
    determine a radio frequency map of the wireless network;
    determine signal strength of external networks;
    determine signal strength of the wireless network;
    compare signal strengths;
    determine radiation patterns;
    adjust antenna directivity and radiation pattern; and
    report to the central controller information related to the RFSD and the wireless network.

11. The RFSD of claim 1, wherein the central controller is further configured to trigger the RFSD to determine a radio frequency map of the wireless network.

12. The RFSD of claim 1, wherein the central controller is further configured to generate a report about the RFSD and to perform software upgrade on the RFSD.

13. The RFSD of claim 1, wherein the central controller is configured to instruct the RFSD to adjust antenna directivity and radiation pattern.

14. The RFSD of claim 1 wherein said CC includes:
    a control authority containing knowledge of primary and secondary devices of said wireless communications system;
    a central registry configured to accept registration from said RFSD; and
    a switchable communications means for enabling communicating between said RFSD and said CC.

15. The RFSD of claim 14, further including one or more of: a power means for powering said RFSD, an RF detection means for detecting source or destination of RF waves, an auxiliary communication port means for updating, reconfiguring or modifying said RFSD, and an anti-tampering means for detecting tampering activities on said RFSD.

16. The RFSD of claim 15 further including one or more of: a battery, a micro controller, a radio direction finder (RDF) unit, an auxiliary infrared (IR) unit, and a reverse engineering proofing unit.

17. The RFSD of claim 15, further comprising operating means for initializing the RFSD, validating the first wireless packet received from the first wireless device, creating an altered wireless packet based on the first wireless packet, and transmitting said altered packet to the second wireless device, wherein said transmitter and said receiver are configured in directions distinct from one another.

18. The RFSD of claim 15, wherein the network controller is further configured to communicate with one or more primary devices and one or more secondary devices of a local area network (LAN).

19. The RFSD of claim 18, wherein said communication may be wired or wireless.

20. The RFSD of claim 18, wherein said RFSD is proximately positioned at an edge of the perimeter of the wireless communication system.

21. The RFSD of claim 1, further comprising a microcontroller capable to initialize a sequence to detect a wireless packet from an external network.

22. The RFSD of claim 21 wherein the receiver is further configured to receive one or more wireless packets from a target network or target wireless packet transmitter after initialization of the receiver.

23. The RFSD of claim 22 wherein said RFSD is configured to validate said receipt of said one or more wireless packets from the target network or target wireless packet transmitter.

24. The RFSD of claim 23 wherein said RFSD is configured to create an altered wireless packet having similar characteristics to said one or more wireless packets from the target network or target wireless packet transmitter.

25. The RFSD of claim 24 wherein said RFSD is configured to transmit said created altered packet outward from an edge of the perimeter of the wireless communication system and towards the target network or a target wireless packet receiver intended to receive said one or more wireless packets.

26. A method of shielding the radio frequency (RF) communications traffic across a perimeter edge of a locale of a network from detection, wherein said network includes a radio frequency security device (RFSD) having a transmitter, a receiver, and an antenna to transmit and receive wireless packets, the method comprising:
    initializing said RFSD;
    receiving by the RFSD one or more wireless packets from a source device;
    validating by the RFSD receipt of said one or more wireless packets from said source device;
    creating by the RFSD an altered wireless packet having similar characteristics to said one or more wireless packets;
    transmitting by the RFSD said altered packet in a trajectory directionally related to said source device to make said one or more wireless packets indecipherable to a target device as said one or more wireless packets traverse the perimeter edge of the locale; and
    adjusting, by a central controller (CC) operatively coupled to the RFSD via a secure communication channel, the perimeter edge of the locale;

communicating, by the RFSD, with one or more access points (APs) or other wireless devices resident within a locale; and tracking and locating, by the RFSD, external devices or networks, or local devices.

27. The method of claim 26, further comprising:
collecting, by the central controller, data from the RFSD, and
monitoring, by the central controller, operational status of the RFSD.

28. The method of claim 26, further comprising:
sharing, by the central controller, information related to the RFSD to another central controller operatively coupled to said central controller and the RFSD.

29. The method of claim 26, further comprising:
periodically triggering, by the central controller, the RFSD to determine a radio frequency map of the network.

30. The method of claim 26, wherein controlling, by the central controller, the perimeter edge of the network further includes instructing, by the central controller, the RFSD to adjust antenna directivity and radiation pattern.

31. The method of claim 26, further comprising registering the RFSD with the CC; and enabling communications between said RFSD and said CC.

32. The method of claim 31 wherein said source device is external to the locale.

33. The method of claim 32 wherein said trajectory directionally related to said source device is inward and towards said locale.

34. The method of claim 31 wherein said source device is internal to the locale.

35. The method of claim 34 wherein said trajectory directionally related to said source device is outward and away from said locale.

36. A system, comprising:
a first device configured to receive a first wireless packet from a second device located internal or external to a perimeter of a wireless network, and to transmit a second wireless packet to a third device located internal or external to said perimeter of the wireless network to make the first wireless packet indecipherable to the third device; and a controller operatively coupled to the first device via a secure communication channel and configured to adjust said perimeter of the wireless network,
wherein the first device is further configured to periodically:
determine a radio frequency map of the wireless network;
determine signal strength of external networks;
determine signal strength of the wireless network;
compare signal strengths;
determine radiation patterns;
adjust antenna directivity and radiation pattern; and
report to the controller information related to the first device and the wireless network.

37. The system of claim 36, wherein the controller is further configured to collect data from the first device and to monitor an operational status of the first device.

38. The system of claim 36, wherein the controller is further configured to receive configuration information related to said perimeter of the wireless network from an administrator of the wireless network.

39. The system of claim 36, further comprising another controller operatively coupled to the first device and the controller, and wherein the controller is further configured to share information related to the first device with the another controller.

40. The system of claim 36, wherein the controller includes:
a registry to receive registration request from the first device; and
a control authority having information related to the first device, the second device and the third device.

41. The system of claim 36, wherein the controller is separate and distinct from the first device.

42. The system of claim 36, wherein the controller is further configured to trigger the first device to periodically determine a radio frequency map of the wireless network.

43. The system of claim 36, wherein the controller is further configured to generate reports about the first device and to perform software upgrade on the first device.

44. The system of claim 36, wherein to adjust said perimeter of the wireless network, the controller is configured to instruct the first device to adjust antenna directivity and radiation pattern.

* * * * *

UNITED STATES PATENT AND TRADEMARK OFFICE
CERTIFICATE OF CORRECTION

| | | |
|---|---|---|
| PATENT NO. | : 7,961,886 B2 | Page 1 of 1 |
| APPLICATION NO. | : 11/933346 | |
| DATED | : June 14, 2011 | |
| INVENTOR(S) | : Tiwari | |

It is certified that error appears in the above-identified patent and that said Letters Patent is hereby corrected as shown below:

Column 1, line 11, delete "60,504,615," and insert -- 60/504,615, --.

Column 1, lines 12-13, delete "60,531,972," and insert -- 60/531,972, --.

Column 12, lines 25-26, in Claim 21, delete "microcontroller" and insert -- micro controller --.

Signed and Sealed this
Eighteenth Day of October, 2011

David J. Kappos
*Director of the United States Patent and Trademark Office*